(12) United States Patent
Timmermans et al.

(10) Patent No.: US 11,903,400 B2
(45) Date of Patent: Feb. 20, 2024

(54) PROCESS FOR LIQUID FOOD PRESERVATION USING PULSED ELECTRICAL FIELD TREATMENT

(71) Applicant: Stichting Wageningen Research, Wageningen (NL)

(72) Inventors: Rian Adriana Hendrika Timmermans, Wageningen (NL); Ricardo Ermirio De Moraes, São Paulo (BR); Hendrikus Cornelis Mastwijk, Bilthoven (NL)

(73) Assignee: STICHTING WAGENINGEN RESEARCH, Wageningen (NL)

( * ) Notice: Subject to any disclaimer, the term of this patent is extended or adjusted under 35 U.S.C. 154(b) by 0 days.

(21) Appl. No.: 15/776,164

(22) PCT Filed: Nov. 17, 2016

(86) PCT No.: PCT/NL2016/050799
§ 371 (c)(1),
(2) Date: May 15, 2018

(87) PCT Pub. No.: WO2017/086784
PCT Pub. Date: May 26, 2017

(65) Prior Publication Data
US 2019/0191745 A1    Jun. 27, 2019

Related U.S. Application Data

(60) Provisional application No. 62/256,497, filed on Nov. 17, 2015.

(30) Foreign Application Priority Data

Jul. 5, 2016 (EP) .................................... 16177902

(51) Int. Cl.
*A23L 3/005* (2006.01)
*A23L 2/48* (2006.01)
(Continued)

(52) U.S. Cl.
CPC ............ *A23L 3/005* (2013.01); *A23C 3/0335* (2013.01); *A23L 2/02* (2013.01); *A23L 2/48* (2013.01); *A23V 2002/00* (2013.01)

(58) Field of Classification Search
CPC ... A23L 3/005; A23L 3/32; A23L 3/18; A23L 2/48; A23C 3/0335; A23C 9/144; A61L 2/03
See application file for complete search history.

(56) References Cited

U.S. PATENT DOCUMENTS

| 4,695,472 A | 9/1987 | Dunn et al. |
| 5,741,539 A | 4/1998 | Knipper et al. |
(Continued)

FOREIGN PATENT DOCUMENTS

| CA | 2758678 | 10/2010 |
| EP | 2 543 254 A1 | 1/2013 |
(Continued)

OTHER PUBLICATIONS

Machine Translation Sato, JPH0628566B2 (Year: 1989).*
(Continued)

*Primary Examiner* — Erik Kashnikow
*Assistant Examiner* — Lela S. Davis
(74) *Attorney, Agent, or Firm* — Foley & Lardner LLP; Sunit Talapatra; Kiri Lee Sharon

(57) ABSTRACT

The present invention relates to a process for fast and homogeneously heating a liquid product to a predetermined temperature by means of resistive heating. Sufficient and effective microbial inactivation is achieved upon applying an electrical field strength of between 0.1-5.0 kV/cm for a prolonged period of time, thus by selecting a relatively low electrical field strength and a pulse duration of at least 10 microseconds while the maximum temperature of the liquid product autonomously remains below 92° C. during the
(Continued)

resistive heating. The present invention further relates to said process wherein the liquid product is pre-heated prior to subjecting the liquid product to the process. The present invention also relates to the liquid product obtainable by the process according to the invention.

19 Claims, 9 Drawing Sheets

(51) Int. Cl.
  *A23C 3/033* (2006.01)
  *A23L 2/02* (2006.01)

(56) References Cited

U.S. PATENT DOCUMENTS

| | | | |
|---|---|---|---|
| 5,837,303 A * | 11/1998 | Hayden | A23L 3/30 426/237 |
| 2004/0005242 A1 * | 1/2004 | Koulik | A61L 2/03 422/38 |
| 2010/0297313 A1 | 11/2010 | Koulik et al. | |
| 2012/0103831 A1 | 5/2012 | Schrive et al. | |
| 2014/0017760 A1 * | 1/2014 | Kniep | C12N 1/02 435/173.9 |

FOREIGN PATENT DOCUMENTS

| | | |
|---|---|---|
| JP | 2007-229319 A | 9/2007 |
| JP | 2015-159734 A | 9/2015 |
| WO | WO-2013/141703 A1 | 9/2013 |
| WO | WO-2014/079149 A1 | 5/2014 |

OTHER PUBLICATIONS

International Search Report issued in International Patent Application No. PCT/NL2016/050799, dated Jan. 24, 2017.

El Zakhem et al., "Behavior of yeast cells in aqueous suspension affected by pulsed electric field", Journal of Colloid and Interface Science, 2006, vol. 300, pp. 553-563.

El Zakhem et al., "Influence of temperature and surfactant on *Escherichia coli* inactivation in aqueous suspensions treated by moderate pulsed electric fields", International Journal of Food Microbiology, 2007, vol. 120, pp. 259-265.

Heinz et al., "Preservation of liquid foods by high intensity pulsed electric fields—basic concepts for process design", Trends in Food Science and Technology, 2002, vol. 12, pp. 103-111.

Mastwijk et al., "Definitions and guidelines for reporting on pulsed electric field experiments", Chapter 21, Food Preservation by Pulsed Electric Fields, 2007, 26 pages.

Raso and Alvarez, "Pulsed electric field", Encyclopedia of Food Microbiology, vol. 2, 2014, pp. 966-973.

Saulis and Wouters, "Probable mechanisms of microorganism inactivation by pulsed electric fields", Chapter 9, Food Preservation by Pulsed Electric Fields, 2007, 19 pages.

Sharma et al., "Bacterial inactivation in whole milk using pulsed electric field processing", International Dairy Journal, 2014, vol. 35, pp. 49-56.

Wouters et al., "Effects of pulsed electric fields on inactivation kinetics of Listeria innocua", Applied and Environmental Microbiology, Dec. 1999, vol. 65, No. 12, pp. 5364-5371.

Eynard et al., "Electrooptics Studies of *Escherichia coli* Electropulsation: Orientation, Permeabilization, and Gene Transfer", Biophysical Journal, 1998, vol. 75, pp. 2587-2596 (10 pages).

* cited by examiner

PROCESS FOR LIQUID FOOD PRESERVATION USING PULSED ELECTRICAL FIELD TREATMENT

CROSS-REFERENCE TO RELATED APPLICATIONS

This application is the National Phase of International Patent Application No. PCT/NL2016/050799, filed Nov. 17, 2016, published on May 26, 2017 as WO 2017/086784 A1, which claims priority to European Patent Application No. 16177902.0, filed Jul. 5, 2016 and U.S. Provisional Application No. 62/256,497, filed Nov. 17, 2015. The contents of these applications are herein incorporated by reference in their entirety.

FIELD OF THE INVENTION

The present invention relates to a process for fast and homogeneously heating a liquid product to a predetermined temperature by means of resistive heating. The present invention further relates to said process wherein the liquid product is pre-heated prior to subjecting the liquid product to the process.

BACKGROUND OF THE INVENTION

Pulsed electrical fields (PEF) is used as a technology to induce electroporation of a cell membrane by the application of pulses of a short period of time by an external electrical field of high intensity. The most widely accepted theory for this phenomena is that by application of an external electrical field on a biological membrane, local instabilities in the lipid bilayer are induced, eventually leading to pore formation. The formation of pores (electroporation) enhances permeability across the membrane (electro-permeabilization) that, depending on the intensity of the applied electric field, is either a reversible process or when applied at high voltages, is irreversible, leading to cell death.

In a continuous flow PEF treatment system different critical times have to be considered (Mastwijk et al., 2007) including the duration of a pulse, the time between two pulses (pause time), the residence time of a fluid element in the high electrical field region and the transit time, the time to leave high electrical field region before entering the cooling section. The total (effective) treatment time is defined as the product of the number of pulses and the time per pulse that is received by a fluid element at high electrical field conditions when pumped through the treatment device. Currently, the total treatment time and electrical field strength are known as critical factors that determine the efficiency for irreversible electroporation (Saulis and Wouters, 2007). Irreversible electroporation is effective on vegetative micro-organism at field strengths in the range of 10-20 kV/cm when using pulses of 2 microsecond duration for a total treatment time of 100-400 microseconds (FIG. 1). Reynard and co-workers (1998) have investigated the critical effect on the pulse duration of a single pulse for gene transfer. They found that a minimum pulse time is needed for orientation of ~1 millisecond and indicated critical response times for permeabilization from 3 to 5 milliseconds using pulses of 24 milliseconds duration at an electrical field strength of 1-2.7 kV/cm.

Contrary to direct current (DC) pulses, alternating current (AC) currents are used to invoke high electrical field conditions in a liquid. Although AC currents with a fixed frequency (f) can be viewed as pulses with a duration of 1/f, the characteristic pulse shape considered here is rectangular meaning that the repetition frequency of pulses is less than the bandwidth (1/pulse duration). AC currents at frequencies greater than 1 MHz (or pulse durations less than 1 microsecond) has been considered in US 2010/0297313.

The choice for the specific treatment conditions is related to the different applications and purpose of the electroporation. Reversible electroporation is a procedure regularly used in molecular biology and clinical biotechnology to introduce small or large molecules into the cell, i.e. drugs, oligonucleotides, antibodies and plasmids into the cytoplasm, aiming at keeping cells to stay alive. Irreversible electroporation can be used to extract molecules from the cell or to inactivate cells. In this invention, we aim for irreversible electroporation as a non-thermal preservation method, where the maximum temperature obtained by PEF processing and the holding time is lower than by conventional heat pasteurisation. This results for example amongst other beneficial aspects in a better preservation of the fresh taste and nutritional values of the product.

The processing conditions that are selected for pulsed electrical treatment when aimed at microbial inactivation is dependent on several factors but can be classified into three groups: processing parameters, microbial characteristics and treatment medium characteristics.

In addition to the electrical field strength and treatment time, the temperature is considered as critical to the effectiveness of microbial inactivation by PEF (Raso et al., 2014). Increase of electrical field strength and treatment time will lead to an increased PEF lethality. As a result of these conditions, more energy will be applied per mass unit, leading to more heating up of the product. Typical process conditions used for irreversible electroporation are in the range of short pulses of micro-seconds at a high voltage (5-80 kV/cm).

The extent of microbial inactivation by PEF is enhanced by increasing the temperature of the medium, e.g. the liquid food product, prior to PEF treatment, even in the range of temperatures that are not lethal for micro-organisms. Without wishing to be bound by theory, this pre-heating effect has influence on the phospholipid bilayer structure of the cell membrane, making the cells more vulnerable for the PEF-process (Wouters et al., 1999).

Characteristics of the micro-organism have influence on the effectiveness of microbial inactivation by PEF. Generally, it has been reported that relatively large micro-organisms are more sensitive towards PEF than smaller micro-organisms, and Gram-negative micro-organisms are more sensitive towards PEF than Gram-positive micro-organisms.

The effectiveness of PEF treatment is often studied in liquid media suspended with micro-organisms. Characteristics of this treatment medium have been investigated, and pH has been reported to be of major importance for the efficacy of the treatment. That is to say, PEF is much more effective in media at low pH than in media at neutral pH.

Commercial application of irreversible PEF processing is aiming at inactivation of micro-organisms in continuous-flow by single passage through a treatment device. Circulation loops providing more than one passage through the treatment device by mixing treated product with untreated product as described in US 2012/0103831 are avoided due to process complexity.

As mentioned before, application of external pulses to the product, introduces energy to the product, resulting in a temperature increase of the product. This temperature increment is dependent on the chosen process conditions and product characteristics (Heinz et al., 2002). To avoid excessive heating of the product, a cooling section was placed between two treatment chambers in some applications (Sharma et al., 2014); however, more electrical energy and energy for cooling is necessary in this approach. Another possibility described to avoid too much heating is to introduce pauses after application of pulses or after a train of pulses (El Zakhem et al., 2006); however, this is not possible in commercial applications as the total treatment time increased to 5200 s-7800 s in this study (El Zakhem et al., 2007) whereas typical times for in-line heat pasteurisation are in the range of seconds to minutes. Pauses between pulses or between series of pulses of at least one minute are also applied in batch system described in CA 2758678.

Commercially applied treatment conditions are such that PEF is conducted with electrical field strengths of between 10 and 30 kV/cm, because application of higher electrical field strengths has technical limitations, and may cause the dielectric breakdown of the food material.

Applied process conditions are suitable for liquid food products with low pH, i.e. high-acid fruit juice, with a pH below about 4.6. These process conditions appear in several applications to be suitable for inactivating larger sized micro-organisms in liquid food products. Furthermore Gram-negative micro-organisms can be inactivated more effective than Gram-positive micro-organisms. Especially inactivating small size Gram-positive bacteria is in most cases cumbersome with the currently known PEF process conditions. In addition, current low-pH process conditions are not applicable in an effective way for food products having a pH higher than about 4.6.

Current PEF processes for liquid food products encompasses electrical field strengths that are relatively high, i.e. 5 kV/cm and higher, typically 10-30 kV/cm. These relatively high electrical field strengths generally hamper upscaling of the PEF processing up to the large volumes by requirements of peak power and limitations in duration of a single pulse by the maximum stored pulse energy. These technological boundaries limit the maximum throughput of a single line for preservation of low conductive acid fruit juices to 5000 L/h.

Thus, there is a need for PEF processing conditions that are:

efficient in inactivating Gram-positive bacteria and/or microbes with relatively small size, preferably without losing efficiency regarding inactivating Gram-negative bacteria and/or inactivating microbes having a relatively large size; and/or inactivating micro-organism and/or spores in liquid food products having a pH higher than about 4.6 and a pH lower than 4.6; and/or economically more profitable than existing inactivation technologies; and/or applicable and have the possibility to scale up to larger throughput volumes using a single line than the current state of the art conditions used.

SUMMARY OF THE INVENTION

The current invention relates to a process for fast and homogeneously heating a liquid product to a predetermined temperature by means of resistive heating, to obtain heated liquid product, comprising:
(a) providing a liquid product;
(b) providing an apparatus for fast and homogeneously heating a liquid product to a predetermined temperature by means of resistive heating;
(c) continuously supplying the liquid product to the inlet of the apparatus and flowing the liquid product through the apparatus;
(d) continuously generating an electrical current through the flowing liquid product in the apparatus, wherein minimal one pulse is applied on each fluid element during passage with a pulse duration of at least 10 microseconds and wherein the electrical field strength is 0.1 to 5 kV/cm; and
wherein the maximum temperature of the liquid product autonomously remains below 92° C. during the resistive heating.

It is part of the invention that the pulse duration of a single pulse is a critical factor rather than the total effective treatment time. At pulse duration of 2 microseconds ($\tau$) and electrical field strengths (E) of 10 kV/cm the inventors found that inactivation was not efficient, despite that the total effective treatment time calculated as $E^2 \cdot \tau$ was 4 times higher than at 20 kV/cm where conventional PEF treatment is employed. At conditions of 0.1-5 kV/cm inactivation was found to be efficient only for pulse durations in excess of 10 microseconds, e.g. between 100 and 1000 microseconds.

The process of the invention is applicable to liquid food products and liquid feed products, and the PEF processing conditions of the invention are equally effective in inactivating Gram-negative bacteria as well as Gram-positive bacteria. The PEF processing conditions are applicable to liquid food products and liquid feed products, which conditions are effective in both inactivating relatively large microbes and inactivating relatively small microbes. Furthermore, the inventors surprisingly found PEF processing conditions now applicable under currently applied conditions of relatively low pH, as well as applicable under conditions at higher pH. Finally, the inventors found processing conditions applicable to higher throughputs of liquid food products or liquid feed products than the throughputs that were previously possible with the process for fast and homogeneously heating a liquid product to a predetermined temperature by means of resistive heating, known in the art.

A second aspect of the current invention relates to a liquid product obtainable by the process according to the invention.

DETAILED DESCRIPTION OF THE INVENTION

Figure 1A:
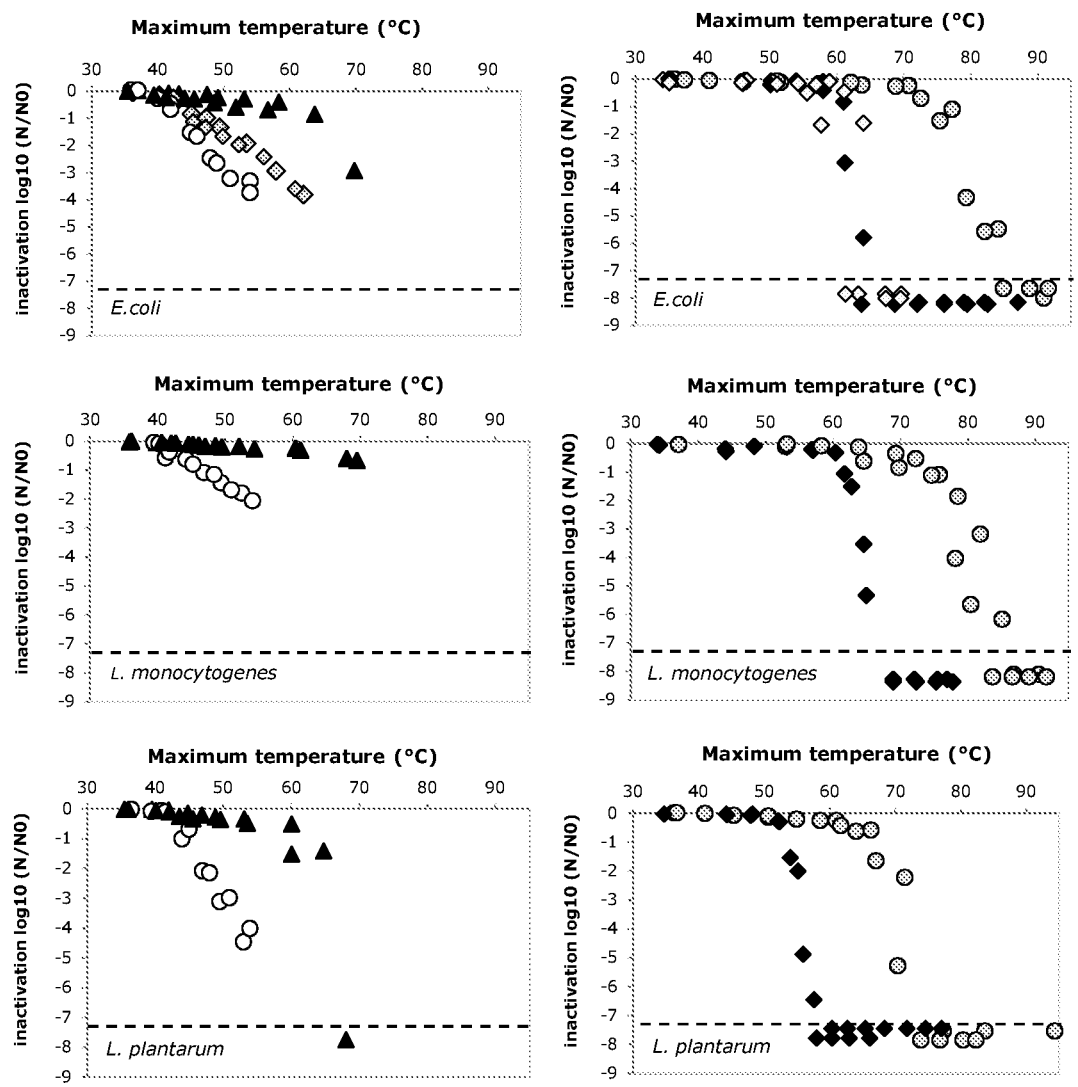
FIG. 1A, FIG. 1B. Reduction of viable counts of *Escherichia coli, Listeria monocytogenes, Lactobacillus plantarum, Salmonella Senftenberg, Saccharomyces cerevisiae* in orange juice at pH 3.8 after various PEF-treatment conditions. Panels on the left represent PEF conditions currently used, and panels on the right show PEF conditions of the invention. Reference to the various PEF-treatment conditions related to each panel is made below the panels of FIG. 1B. Solid black triangles: 10 kV/cm, 2 microseconds; solid gray diamonds: 15 kV/cm, 2 microseconds; open white circles: 20 kV/cm, 2 microseconds; solid gray circles: 0.9 kV/cm, 1000 microseconds; solid black diamonds: 2.7 kV/cm, 1000 microseconds; open white diamonds: 2.7 kV/cm, 100 microseconds; dashed line: detection limit.

The inventors now found PEF processing conditions applicable to liquid food products and liquid feed products, which conditions are equally effective in inactivating Gram-negative bacteria as well as Gram-positive bacteria. The inventors also found PEF processing conditions applicable to liquid food products and liquid feed products, which conditions are effective in both inactivating relatively large microbes and inactivating relatively small microbes. Furthermore, the inventors surprisingly found PEF processing conditions now applicable under conditions of relatively low pH, as well as applicable under conditions at higher pH. Finally, the inventors found PEF processing conditions applicable to larger volumes of throughput of liquid food products and liquid feed products than the volumes that were previously possible with currently available processes.

Herewith, the inventors provide for a process that addresses many of the shortcomings related to currently known processes for heating a liquid product to obtain liquid product with a diminished microbial load.

The current invention relates to a process for fast and homogeneously heating a liquid product to a predetermined temperature by means of resistive heating, to obtain heated liquid product, comprising:
  (a) providing a liquid product;
  (b) providing an apparatus for fast and homogeneously heating a liquid product to a predetermined temperature by means of resistive heating;
  (c) continuously supplying the liquid product to the inlet of the apparatus and flowing the liquid product through the apparatus;
  (d) continuously generating an electrical current through the flowing liquid product in the apparatus, wherein minimal one pulse is applied on each fluid element during passage with a pulse duration of at least 10 microseconds and wherein the electrical field strength is 0.1 to 5 kV/cm; and
  wherein the maximum temperature of the liquid product autonomously remains below 92° C. during the resistive heating.

According to the invention, the process for fast and homogeneously heating a liquid product to a heating temperature by means of resistive heating, provides a heated liquid product with a diminished microbial load.

Heating a liquid product to a temperature above a certain maximum temperature, e.g. a predetermined maximum temperature, may cause unwanted reduction of fresh flavours, vitamins and nutrients and denaturation of proteins present in the fresh (untreated) product. The degree of reduction and denaturation of the components is related to the temperature and time the product is exposed to the treatment. Varying liquid products are exposed to varying temperature-time combinations to obtain the desired degree of enzymatic and microbial inactivation. Alternative (non)-thermal processes with a reduced temperature and/or time exposure to the product are therefore gaining a lot of interest, as they can better retain the fresh characteristics of the product. When either the temperature or the exposure time can be reduced, a better product quality can be expected. In the process of the invention, the exposure time to the heat is reduced tremendously, and due to the chosen process conditions the maximum temperature of the liquid product autonomously remains below about 92° C. during the resistive heating. Preferably, the maximum temperature of the liquid product autonomously remains below a critical temperature during the resistive heating according to the process of the invention, at which temperature of the liquid product does not suffer from reduction of the heat-sensitive components or denaturation of the proteins, if present in the product, while at the same time the microbial load in the liquid product is reduced to an acceptable level aimed for. It is now due to the process of the current invention that processing conditions have become applicable which both prevent overheating of the liquid product while still effectively and efficiently lowering the microbial load of the liquid product.

In the process according to the invention the pulse duration of a single pulse is a critical factor rather than the total effective treatment time. When applying pulse duration times of 2 microseconds and electric field strengths of 10 kV/cm, it was determined that inactivation of microbes was not efficient, despite that the total effective treatment time was four times more than at 20 kV/cm, which is the electric field strength at which conventional PEF treatment is employed. Without wishing to be bound by theory, the explanation is that at the reduced electrical field strength of 10 kV/cm the electroporation effect is compromised.

The inventors now surprisingly found that at conditions of low electrical field strengths of 0.1-5 kV/cm combined with prolonged pulse durations of 100 and 1000 microseconds, microbial inactivation was effective to achieve inactivation at temperature-time combinations less intensive than required by conventional heat pasteurisation or PEF treatment at 10 kV/cm. Without wishing to be bound by theory, these findings indicates that the pulse duration has become the critical factor in the process according to the invention.

Without wishing to be bound by theory, an external electrical field applied to a product, has an influence on the protein channels in the cell membrane, and/or the lipid domain of the cell membrane of a micro-organism present in the product, resulting in conformational changes in the channels and/or the domain. Membrane protein channels open at 50 mV membrane potential, which is considerable lower than the 150-400 mV required for pore formation in the lipid double layer (Tsong, 1992).

As the opening and closing of many protein channels is dependent on transmembrane potentials, it is hypothesized that when the electrical treatment is applied, the voltage-sensitive protein channels will be opened. Once these channels will be opened, they would conduct higher current than the current for which these channels are designed. As a result, these channels can become irreversibly denaturated by Joule heating and/or electrical modification of their functional groups occurs (Tsong, 1992). The opening/closing of a protein channel takes place in the sub-microsecond time range, whereas denaturation of a protein takes milliseconds to seconds (Tsong, 1992).

This suggests, that protein channels may be affected at electrical field strengths 3 to 8 times smaller than the electrical field strengths at which lipid double layers are affected; that is to say, an electrical field strength of between 2.5 kV/cm and 7 kV/cm for inactivation of the protein channel compared to the required 20 kV/cm for irreversible damage by electroporation of the lipid double layer (i.e. conventional PEF conditions). According to the invention, an electrical field strength of between 0.1 kV/cm and 5 kV/cm in combination with a pulse duration of 10-1000 microseconds is sufficient and efficacious with regard to establishing efficient inactivation of microbes in a liquid product. For example, the process of the invention is applicable for a liquid product in a 1 L/h PEF apparatus (PEF system'). For said exemplifying liquid product, the pulse duration was set to either 100 microseconds or 1000 microseconds and the selected electrical field strength, or 'electric field strength', was either 0.9 kV/cm or 2.7 kV/cm. The number of pulses applied to the liquid product varied between 0 and 35, the time lapse between two consecutive pulses varied between 0.6 milliseconds and 199 milliseconds, and as a result the maximum temperatures obtained varied between 36° C. and 92° C. See for a more detailed outline of examples demonstrating the efficiency of the process of the invention the Example 1, below.

The inventors now found that microbial inactivation was in particular efficient for vegetative cells. Most likely, based on this effect of the process of the invention, the process according to the invention provides for an efficient mechanism of inactivating spores as well. Spores contain essential proteins for germination in the inner membrane and in the spore cortex that are targets for external electrical stimuli.

As a further example of the application of the process of the invention, for example a batch of liquid product is processed in the process of the invention, applying a 1200 L/h PEF apparatus for fast and homogeneously heating a liquid product to a predetermined temperature by means of resistive heating. The pulse duration is 1000 microseconds and the electrical field strength is 2.0 kV/cm. The number of pulses applied to the liquid product is about 5 pulses and the time lapse between two consecutive pulses is 3.8 milliseconds. See also Example 3, below, for the detailed embodiment of the invention.

One embodiment of the invention is the process according to the invention, wherein the pH of the liquid product is between pH 1.5 and 9.0, preferably above 4.6, preferably between 4.8 and 9.0, more preferably between 5.5 and 8.0, more preferably between 6.0 and 7.5. One embodiment of the invention is a process of the invention, wherein the pH is above about 5.0, preferably about 6.0.

Further, in one embodiment the invention relates to the process according to the invention, wherein the pH of the liquid product is lower than 4.6, preferably between 1.5 and 4.6, more preferably between about 1.5 and about 3.8.

In a further embodiment of the present invention, in the process according to the invention the pH of the liquid product is higher than 4.6, preferably between 4.6 and 9.0. One embodiment of the invention is a process according to the invention, wherein the pH of the liquid product is between 5.0 and 9.0, preferably between 6.0 and 9.0.

It is now due to the applicability of the process of the invention, that liquid products having a wide range of pH are processed in one and the same process according to the invention. Since the process of the invention is applicable for processing liquid products with such widely varying pH, the diversity of liquid products for which PEF processing is desirable and which are selectable for processing in the process of the invention, is very large. Virtually any liquid product, ingredient or semi-finished product applied in for example food processing is now suitable for fast and homogenously heating by the process of the invention. Due to the surprising finding of the inventors that their PEF process is effective and efficient in such a wide pH range, processing food products with a process incorporating PEF according to the invention has now become wider accessible than before.

Furthermore, one embodiment of the invention is the liquid product according to the invention, wherein the liquid product has an electrical conductivity between 0.01 and 10 S/m measured at 20° C., more preferably between 0.1 and 3 S/m measured at 20° C., most preferably between 0.2 S/m and 0.8 S/m measured at 20° C.

Electrical conductivity within these indicated boundaries is typically preferred since such electrical conductivity aids the fast and homogeneously heating of a liquid product according to the process of the invention. Since most liquid food products have an electrical conductivity within the boundaries applicable for application of the process of the invention with said liquid food products, the process of the invention is applicable for processing numerous liquid food products for which lowering the microbial load is desired. For example, electrical conductivity at 20° C. has been measured for several batches of liquid food products and was for example 0.1 S/m for a cranberry juice, 0.15 S/m for a beer, 0.2 S/m for an apple juice, 0.4 S/m for a chocolate milk, 0.45 S/m for a whole milk, 0.4 S/m for soy milk, 0.25 S/m for almond milk, 1.0 S/m for a carrot juice, and 1.8 S/m for tomato sauce. Thus, the process of the invention is applicable for a wide array of widely varying liquid food products.

Without wishing to be bound by theory, it appears that the PEF processing conditions of the current invention open up a way to a new mechanism for microbial inactivation.

The inventors now found that liquid food products are effectively pasteurized, i.e. microbes were inactivated effectively and efficiently, when applying PEF processing conditions of the invention comprising a surprisingly low electrical field strength of 0.1-5 kV/cm, preferably 4 kV/cm or lower, more preferably 3 kV/cm or lower, in combination with a pulse duration of 10-1000 microseconds, preferably about 1000 microseconds, more preferably about 100 microseconds, and at a maximum temperature of the liquid food product of between 40° C. and 92° C., preferably between 50° C. and 92° C., more preferably between about 60° C. and 85° C.

According to the invention, pasteurization upon applying the process of the invention is particularly efficient and effective when the number of pulses applied to the continuously flowing liquid product is at least 1, preferably 1 to 100, more preferably 5-50 for each fluid element during passage within the treatment zone.

The number of pulses is given by equation 1, where n, is the number of pulses, V is the volume of the treatment chamber (L), f is the pulse frequency used (Hz), and φ is the flow rate (L/h):

$$n = \frac{V \cdot f}{\phi} \quad \text{(equation 1)}$$

The number of pulses is not a critical step in designing the process, as long as at least one pulse is applied to every fluid element flowing through the treatment chambers of the apparatus for fast and homogeneously heating a liquid product, according to the invention. To guarantee that at least one pulse to every fluid element is applied, the system has to be designed with the purpose that the residence time in the treatment chamber is larger than 1/f The number of pulses applied will be the result of the process design, based on desired throughput of liquid product (φ, L/h), the conductivity of the liquid product (σ, S/m), specific heat capacity of the product ($c_p$, kJ/kg·K), density of the product (ρ, kg/m³), applied electrical field strength (E, V/m), pulse duration ($\tau_{pulse}$, s) and temperature gradient (ΔT, ° C.) obtained with the process (difference between inlet temperature of the liquid product and outlet temperature). Relationship between these parameters is given in equation 2.

$$\Delta T(\rho \cdot c_p) = \sigma \cdot E^2 \cdot n \cdot \tau_{pulse} \quad \text{(equation 2)}$$

As mentioned before, and as further illustrated in Example 1, below, the pulse duration is critical for the effectiveness of the PEF treatment according to the process of the invention. Thus, application of one relatively long pulse can be more effective than application of more short pulses with a similar total effective treatment time.

For example, for a liquid product processed in a continuous flow 1 L/h PEF apparatus at 1 L/hr according to the process of the invention, typically, the pulse duration is about 100-1000 microseconds, and the electrical field strength is about 2.7 kV/cm. Typically, the number of pulses is then about 1-25, and the time laps between two consecutive pulses is about 0.6-39 milliseconds, dependent on the desired temperature increase across the treatment chambers, being the difference between the inlet temperature and maximum temperature.

For example, for a liquid product batch processed in a 1200 L/h PEF apparatus according to the process of the invention, typically, the pulse duration is 1000 microseconds, and the electrical field strength is about 2.0 kV/cm, in the process according to the invention. Typically, the number of pulses is then about 5, and the time laps between two consecutive pulses is about 3.8 milliseconds.

Typically, the process of the invention is applicable for processing a liquid product in a PEF apparatus having a throughput of between 30 L/h and 200 L/h, according to the invention. Typically, the process of the invention is applicable for processing a liquid product in a PEF apparatus having a throughput of about 30.000 L/h, according to the invention.

One embodiment of the invention is the process of the invention, wherein the apparatus for fast and homogeneously heating a liquid product to a predetermined temperature has a throughput of between about 1 L/h and about 30.000 L/h, preferably about 1 L/h or about 30 L/h, or about 200 L/h, or about 1200 L/h, or about 30.000 L/h.

Again, without wishing to be bound by theory, these PEF processing conditions of the invention result in inactivation of microbes following the theoretical mechanism of inactivating the protein channels of the membrane of cells. These new PEF processing conditions of the invention provides new opportunities in microbial inactivation compared to the currently used treatment conditions for PEF. With these new conditions of the invention, all vegetative micro-organisms are inactivated, with no preference of inactivation for relatively large micro-organisms and/or for Gram-negative micro-organisms in comparison to relatively smaller micro-organisms and/or Gram-positive micro-organisms.

Thus, with the process of the invention, Gram-negative micro-organisms such as for example *Escherichia coli* strains, *Salmonella* species, other Enterobacteriacea and acetic acid bacteria are inactivated in liquid products. In addition, with the process of the invention, Gram-positive micro-organisms such as for example *Listeria monocytogenes, Lactobacillus plantarum, Leuconostoc strains*, and *Streptococcus* species are also inactivated in liquid products. Based on the expected theoretical mechanism, it is expected that also spore-forming bacteria can be inactivated, as their cell membrane also contains voltage-gated channels, like *Alicyclobacillus* bacteria and *Clostridium* bacteria. Furthermore, spores itself contain essential proteins for germination in the inner membrane and the spore cortex that may be targeted by the external applied pulses.

Furthermore, the process of the invention is suitable for inactivation in liquid products of relatively large micro-organisms, such as for example yeasts and moulds. The process of the invention is also suitable for inactivation in liquid products of relatively small micro-organisms, such as for example *L. monocytogenes*. Of course, the process of the invention is equally suitable for inactivation in liquid products of micro-organisms with sizes in between the sizes of these exemplified micro-organisms, shown in example 1

Next, with these new conditions of the invention, inactivation of micro-organisms in all types of (liquid food) products is now possible, since the PEF processing conditions of the invention are equally effective in inactivating micro-organisms in liquid food products having a relatively low pH and in liquid food products having a relatively high pH.

Finally, due to the lower electrical field strength used in the PEF processing conditions of the invention when compared to currently applied PEF conditions, these conditions of the invention are easily scaled up, as lower peak voltages are used in the invention, making the PEF processing conditions of the invention applicable for implementation in industry at larger volumes and throughput. The process of the invention is especially suitable for liquid food products subjected to the process of the invention in an apparatus for fast and homogeneously heating a liquid product to a heating temperature by means of resistive heating, when the residence time of the fluid in the high field region is n about 17 milliseconds to 2 seconds. Frequency of the pulses is restricted between 1 kHz and 50 kHz, to avoid metal release of the electrodes (Mastwijk, 2006). Typically, according to the invention, in the process of the invention the flow rate of the liquid product is then between about 1 L/h and 5000 L/h, preferably between about 1000 L/h and 30.000 L/h.

A further embodiment of the invention is a process according to any of the previous embodiments of the invention, wherein the liquid product is a liquid food product or a liquid feed product.

Further, one embodiment of the invention is the process according to the invention, wherein the liquid product is an ingredient, semi-finished product, or final liquid product, like fruit juice, vegetable juice, infant food, jam, spread or smoothie, an alcoholic or non-alcoholic beverage, dairy product, plant milk product, liquid egg, a soup or a sauce.

One embodiment of the invention is a process for fast and homogeneously heating a liquid product to a predetermined temperature by means of resistive heating according to the invention, wherein the dairy product is selected from milk, a milk product or a liquid composition comprising a milk component or a milk fraction.

Furthermore, an embodiment of the invention is a process according to the invention, wherein the liquid product is a dairy product comprising milk, a milk product, a milk component or a milk fraction.

An important aspect of the invention is the finding that during the PEF processing, no cooling section between the treatment chambers of an apparatus applied in the process according to the invention is required in order to keep the temperature of the liquid product below about 92° C., or below about 85° C., or below about 70° C., or below about 60° C., according to the invention.

As mentioned earlier, in current state of the art processes, cooling sections are added between treatment chambers to avoid overheating of the liquid product. As said, it is now an important finding within the current invention that the cooling during the process of the invention is not required, since the heating up at critical temperatures is very fast (being the residence time in the treatment chambers, being less than 1 second) and the exposure time to the maximum temperature is very short.

To have an efficient process, only the exposure to critical temperatures (being the temperature where product quality will be affected) is obtained with electrical energy, described in the invention. The non-critical temperature domain can be preheating with conventional heating. So, preferably in the process, the liquid product is preheated to a temperature in the range of from 20° C. to 70° C. before being supplied to the apparatus, preferably from 35° C. to 65° C., more preferably from 40° C. to 60° C. One embodiment of the invention is the process according to the invention, wherein the liquid product is preheated before being supplied to the apparatus to a temperature in the range of from 20° C. to 70° C., preferably from 35° C. to 65° C., more preferably from 40° C. to 60° C.

For practical purposes, liquid products subjected to the process according to the invention, such as a liquid food product, are cooled to ambient temperature or below immediately, e.g. cooled to 2-8° C. Since no holding time is required, cooling of a liquid product proceeds directly (preferably within 3 seconds) after the liquid product leaves the high field region. In the current process design of the invention cooling tubes may be installed 0.5 m downstream from the high field region. For a 30.000 L/h (=8.3 L/s) system with 3" piping diameter this means a 2.2 L volume or 0.27 seconds before entering the first cooling section and an approximate 1-5 seconds (depending on viscosity) before the critical temperature drop of first 10° C. from maximum temperature is established, followed by (conventional) cooling towards the desired outlet temperature usually in the range of 4-7° C.

The term "autonomously" has its regular meaning, and here refers to the temperature of the liquid product that reaches a certain value in the process of the invention unaided by external cooling (or heating) during the treatment.

The liquid product, such as for example a liquid food product selected from orange juice, a dairy product, coconut water, watermelon juice, is for example pre-heated to about 40° C., about 50° C. or about 60° C. For example, for efficient and effective inactivating micro-organisms in a liquid product upon application of the process of the invention, the liquid product is preheated to between about 30° C. to 65° C., preferably between 36° C. and 59° C.

Preferably, the maximum temperature of the liquid product autonomously remains below about 85° C. during the resistive heating, more preferably, below about 70° C., or below about 63° C., or below about 60° C., according to the invention. It is part of the invention that process parameters of the process of the invention are selected such that the maximum temperature of the liquid product autonomously remains below a selected temperature. At or below the selected temperature efficient and effective killing of the micro-organisms present in the liquid product is ensured, whereas unwanted reduction of fresh flavours, vitamins and nutrients and denaturation of proteins present in the fresh (untreated) liquid product is prevented, or at least prevented to a large extent, when applying the process of the invention.

By applying the electrical field strength according to the invention, with a pulse duration according to the invention, the inventors surprisingly found that the temperature of the liquid product remains below a maximum temperature of about 92° C., or about 85°, or about 70° C., or about 60° C., according to the invention, making the process of the invention particularly suitable for implementation in a large scale setting, e.g. a commercial setting. An example of a commercial application of the process of the invention is the processing of a liquid food product in an apparatus for fast and homogeneously heating a liquid product to a predetermined temperature by means of resistive heating, wherein the flow of liquid food product through the apparatus is between about 500 L/h to 30.000 L/h, for example about 1200 L/h, according to the invention.

Therefore, one embodiment of the invention is a process according to the invention, wherein the temperature of the liquid product autonomously remains below 85° C. during the resistive heating, preferably below 75° C., more preferably below 60° C.

In one embodiment the invention relates to the process according to the invention, wherein the electrical field strength is lower than about 5 kV/cm.

One embodiment of the invention is a process according to the invention, wherein the electrical field strength is 0.5 to 5 kV/cm, more preferably 2.5 to 4 kV/cm. In one embodiment the invention relates to the process of the invention, wherein the electrical field strength is below about 3 kV/cm, preferably about 2.7 kV/cm or lower, more preferably between about 0.9 and about 2.5 kV/cm.

One embodiment of the invention is a process according to the invention, wherein the pulse duration is at least 10 microseconds, more preferably 10 to 2000 microseconds, even more preferably 50 to 500 microseconds, most preferably 50 to 100 microseconds. In one embodiment the invention relates to the process according to the invention, wherein the pulse duration is between about 100 microseconds and about 1000 microseconds. In a further embodiment the invention relates to a process according to the invention, wherein the pulse duration is 1000 microseconds or lower, preferably about 100 microseconds.

One embodiment of the invention is the process according to the invention, wherein the applied pulses are bipolar pulses. Thus, one embodiment of the invention is a process according to the invention, wherein the minimal one pulse applied to the liquid product is a pulse applied in bipolar pulse form. It is advantageous to apply a bipolar pulse to the liquid product, to avoid electrode damage (Loeffler, 1996).

Of course, it is part of the invention that also other types of pulses are equally applicable in the process of the invention.

The process of the invention is particularly suitable for inactivation of micro-organisms in liquid food products such as juices, sauces, dairy products. That is to say, examples of such liquid food products are an ingredient, a semi-finished product, or a final liquid product, like a fruit juice, a vegetable juice, an infant food, a jam, a spread or a smoothie, an alcoholic or non-alcoholic beverage, a dairy product, a plant milk product, a liquid egg, a soup or a sauce.

One embodiment of the invention is a process according to the invention, wherein the process is a process for inactivation of micro-organisms in the liquid product. As said before, the process of the invention has many advantages over current processes for heating a liquid product by means of resistive heating. One of the major advantages achievable with the process of the invention is the pasteurization of a liquid product, e.g. a liquid food product, wherein the micro-organism is small or large, and wherein the micro-organism is a Gram-negative microbe or a Gram-positive microbe.

For practical purposes, liquid products subjected to the process according to the invention, such as a liquid food product, are cooled to ambient temperature or below, e.g. cooled to 2-8° C., immediately after the process of the invention is applied to the liquid product.

Therefore, one embodiment of the invention is a process, wherein the heated liquid product is cooled immediately after flowing through the apparatus for fast and homogeneously heating a liquid product to a predetermined temperature by means of resistive heating. Of course, for practical purposes, the cooling is suitably applied immediately from the moment the liquid product is flown through the apparatus, e.g. as fast as possible, preferably within 3 seconds.

Thus, also an embodiment of the invention is a process according to the invention, wherein the heated liquid product is cooled after being transferred through the apparatus for fast and homogeneously heating a liquid product to a heating temperature by means of resistive heating. It is part of the invention that the process according to the invention is suitable for application with an apparatus for fast and homogeneously heating a liquid product to a heating temperature by means of resistive heating, which apparatus is run at a flow rate of liquid product of between about 0.5 L/h to about 2000 L/h, preferably at about 0.5 L/h to about 2 L/h, more preferably at about 1 L/h, or equally preferably at about 100 L/h to about 2000 L/h, preferably at about 1000 to 1500 L/h, more preferably at about 1200 L/h. Preferably, the flow rate is about 30.000 L/h.

As said before, it was previously established that preheating a liquid product before subjecting said liquid product to a process for fast and homogeneously heating a liquid product to a predetermined temperature by means of resistive heating, improves the inactivating efficiency during the process. However, cooling of the liquid product during the course of the process was a prerequisite, since the liquid product heated up to unacceptable values upon applying the PEF conditions known in the art. As said, it is now an important finding within the current invention that the cooling during the process of the invention is not required, since the temperature of the liquid product does not exceed an unacceptable threshold. Therefore, in the process of the current invention, the liquid product is adequately preheated before subjecting the liquid product to the process for fast and homogeneously heating a liquid product to a predetermined temperature by means of resistive heating, without the necessity for cooling during the process.

Thus, preferably in the process, the liquid product is preheated to a temperature in the range of from 20° C. to 70° C. before being supplied to the apparatus, preferably from 35° C. to 65° C., more preferably from 40° C. to 60° C.

The process according to the invention is very effective and efficient in inactivating micro-organisms present in the liquid product subjected to the process for fast and homogeneously heating a liquid product to a predetermined temperature by means of resistive heating according to the invention. Applying the process of the invention to a liquid product comprising micro-organisms, the microbial count is reduced with at least 2 log cfu/mL, most preferably 6 log cfu/mL or more.

Thus, preferably the invention is a process, wherein the microbial count (colony forming unit; cfu) in the liquid product is reduced with at least 2 log cfu/mL, preferably at least 5 log cfu/mL, most preferably 6 log cfu/mL or more. One embodiment of the invention is a process according to the invention, wherein the microbial count in the liquid product is reduced with at least 4 log cfu/mL, preferably with at least 7 log cfu/mL.

The inventors established that such reductions of the microbial count in liquid food products contributes to a large extent to the preservation of quality measures of the product. For example, taste, smell, colour and appearance are preserved for an extended period of time for liquid food products subjected to the process of the invention, when compared to untreated liquid food products. For example, with the process of the invention, taste and smell of the liquid food product orange juice is preserved for about 60 days or more, upon application of the process of the invention to the orange juice, when the juice is stored at about 7° C. Equally beneficial is the consolidation of quality of the orange juice for about 23 days, when kept at ambient temperature, after subjecting the orange juice to the process of the invention.

The process of the invention turns out to be equally applicable for inactivating Gram-positive micro-organisms in a liquid product, and for inactivating Gram-negative micro-organisms in a liquid product. Furthermore, the size of the micro-organism does not play a limiting role, meaning that either small sized or larger sized micro-organisms are inactivated by the process according to the invention. The various aspects and embodiments of the invention are thus an important contribution to the art, since up to the present invention, small Gram-positive micro-organisms could not be efficiently inactivated with known processes for fast and homogeneously heating a liquid product to a heating temperature by means of resistive heating. One embodiment of the invention is therefore a process according to the invention, wherein the microbe optionally comprises a Gram-positive micro-organism.

When applying the process according to the invention with a liquid product, the pH of the liquid product is minimally altered during the course of the process, if changed at all. This is a further beneficial feature of the process according to the invention.

In one embodiment, the invention thus relates to a process, wherein the pH of the liquid product at the end of the process is within 0.5 pH unit from the pH at the start of the process, preferably within 0.2 pH unit, more preferably within 0.1 pH unit, most preferably within 0.05 pH unit.

The process according to the invention is suitable for liquid products, in particular liquid food products.

A second aspect of the invention relates to a liquid product obtainable by the process according to the invention as has been described above.

The invention is further illustrated by the following non-limiting examples, provided below.

EXAMPLES

Example 1: Microbial Inactivation of *E. coli*, *Listeria Monocytogenes, Lactobacillus Plantarum, Salmonella Senftenberg*, and *Saccharomyces cerevisiae* at pH=3.6 in Orange Juice (1 L/h Scale)

Pathogenic and spoilage micro-organisms were selected based on their morphology and their association with and prevalence in fruit juice. Furthermore, heat-resistance or PEF resistance of the strains was used as a criteria for selection of the strains. Selected micro-organisms are listed in Table 1.

TABLE 1

Bacterial strains and yeast strain used in this example

| Species/strains used | Culture collection | Bacteria/ yeast | Cell wall structure | Size* (micrometer) | Reference |
|---|---|---|---|---|---|
| *Escherichia coli* | ATCC 35218 | Bacteria | Gram-negative | 1.1-1.5 × 2-6 | Gurtler et al. (2011) |
| *Listeria monocytogenes* NV8 | | Bacteria | Gram-positive | 0.4-0.5 × 0.5-2 | Van der Veen et al. (2009) |
| *Lactobacillus plantarum* | ATCC14917 | Bacteria | Gram-positive | 0.9-1.2 × 3-8 | Campos and Cristianini (2007) |
| *Salmonella entericia* subsp. *enterica* serovar Senftenberg | ATCC43845 | Bacteria | Gram-negative | 0.7-1.5 × 2-5 | Doyle and Mazzotta (2000) |
| *Saccharomyces cerevisiae* | CBS 1544 | Yeast | | 3-15 × 2-8 | Put et al. (1976) |

CBS: Centraal Bureau voor Schimmelcultures (Fungal Biodiversity Centre, Utrecht, The Netherlands); ATCC: American Type Culture Collection, USA
*Characteristic dimensions taken from Bergey, 1986

Fresh cultures of all five micro-organisms, listed in Table 1, were prepared plating from frozen stock on medium and overnight cultivations. Cultivation of *Escherichia coli, Listeria monocytogenes, Saccharomyces cerevisiae* and *Salmonella enterica* sub sp. *enterica serovar Senftenberg*, was described in Timmermans et al., 2014. Fresh cultures of *Lactobacillus plantarum* were prepared similar, by plating from frozen stock on MRS medium, containing 52.2 g MRS (De Man, Rosoga and Sharp broth, Merck) and 12 g agar per 1 L distilled water. Plates were overnight incubated at 30° C. A single colony was used to inoculate a 100 mL flask with 10 mL MRS broth and cultivated for 24 h at 20° C. in a shaking incubator (180 rpm). From this culture, 200 microliter was used to inoculate 19.8 mL fresh MRS broth, supplemented with 1% glucose (100 mL flask) and incubated for 24 h at 20° C. and 180 rpm.

After culturing, cells were washed and suspension of the selected micro-organism was added to orange juice (Minute Maid®), to a final concentration of about 1.0E+8-1.0E+9 cfu/mL.

The inoculated suspension was pumped through a 1 L/h PEF system at a flowrate of 13.0±0.5 mL/min and preheated to 36° C. prior to the electrical treatment. Next, suspension entered two vertically positioned co-linear treatment chambers, wherein the electrical treatment was given. Due to the variation in the intensity of the treatment conditions (electrical field strength, pulse duration and number of pulses applied) juice heated up to variable maximum temperatures autonomously (Table 2 illustrates used conditions). No holding section was added, so directly after leaving the treatment chambers (within 3 seconds), juice was cooled down via a heating spiral that was immersed in a water bath. At the exit, samples were collected aseptically. Due to the variation in chosen frequency, the number of pulses applied and consequential the temperature increase leading to maximum temperature varied (Table 2). Samples were collected at different maximum temperatures, and kinetics for the fixed electrical field strength and pulse duration were determined.

The number of viable microbial cells was determined by plating 100 μL of serially diluted PEF-treated juice in sterile peptone physiological salt diluent (PSDF) on suitable-agar plates supplemented with 0.1% sodium pyruvate to enhance growth of sub-lethally damaged cells (Timmermans et al., 2014). Surviving cells were enumerated after 5 days incubation at 25° C. (*S. cerevisiae*), 30° C. (*L. monocytogenes, L. plantarum*) or 37° C. (*S. Senftenberg, E. coli*).

Temperature before and directly after the treatment chambers was measured using HYP-O T-type thermocouples (Omega). Additionally, maximum temperature was measured indirectly using a NTC-resistor to monitor the maximum temperature. Square wave bipolar pulses, voltage and current in the treatment chamber were recorded with a digital oscilloscope (Rigol DS1102E). The electrical energy was obtained by numerical integration of the voltage and current traces, and equals to the caloric power within the experimental error (10%), according to (Mastwijk, 2006) and (Timmermans et al. 2014)

All experiments were carried out in duplicate.

TABLE 2

PEF conditions used in this study

| Electrical field strength (kV/cm) | Pulse duration (microseconds) | Residence time in the two treatment chambers (milliseconds) | Frequency (Hz) | Number of pulses | Calculated time between 2 consecutive pulses (milliseconds) | Maximum temperature (° C.) |
|---|---|---|---|---|---|---|
| 20 | 2 | 14.5 ± 0.5 | [0-964] | [0-14] | [1.0-5.5] | [36-54] |
| 15 | 2 | 48.9 ± 1.9 | [0-964] | [0-47] | [1.0-5.5] | [36-62] |
| 10 | 2 | 227.3 ± 8.5 | [0-964] | [0-204] | [1.0-5.5] | [36-70] |
| 2.7 | 100 | 17.5 ± 0.7 | [0-1400] | [0-25] | [0.6-2.7] | [36-70] |
| 2.7 | 1000 | 17.5 ± 0.7 | [0-210] | [0-4] | [4.7-39] | [36-87] |
| 0.9 | 1000 | 695.9 ± 26 | [0-50] | [0-35] | [19.0-199] | [36-92] |

Tested conditions are provided in Table 2. Dimensions of the treatment chamber varied to obtain a variable electrical field strength. As a result of this variable dimension, residence times within the treatment chambers were not the same for every tested condition. To obtain the desired maximum temperature, frequency was adjusted. Finally, the number of pulses was calculated by taking the product of residence time and frequency used. Time between two pulses was calculated by dividing the residence time by number of pulses, minus the pulse duration.

Figure 1B:
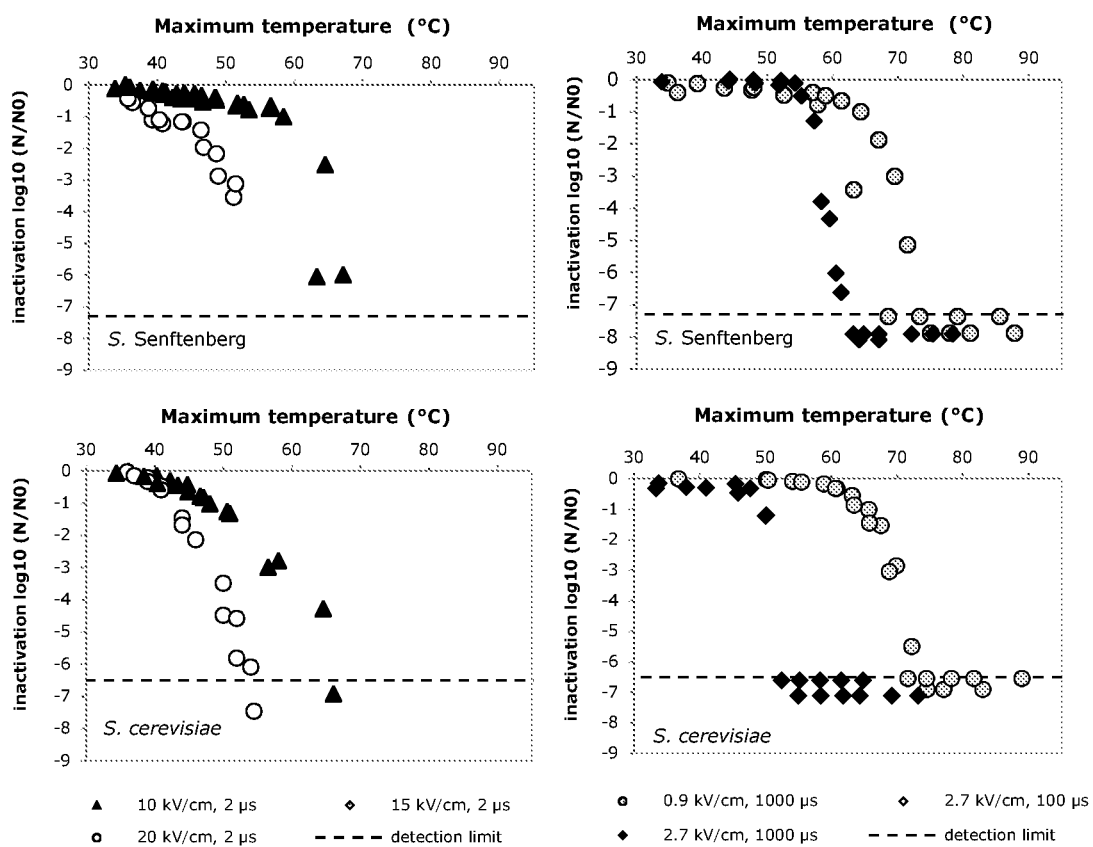

Inactivation is shown as the logarithm of number of surviving micro-organism at tested condition, N, divided by start concentration of micro-organisms, No, being $\log_{10}(N/N_0)$. In FIGS. 1A and 1B, the inactivation is shown as a function of the maximum temperature at the outlet of the treatment chamber for the tested micro-organisms. On the left panel, inactivation at various electrical field strength for short pulses (2 microseconds) are shown, demonstrating the current state of art, and on the right panel, inactivation at various electrical field strength for long pulses (i.e. 100 or 1000 microseconds) are shown demonstrating the invention described in this application.

The inactivation of *E. coli* in orange juice as a function of the electrical field strength and varying pulse duration are shown in FIGS. 1A and 1B.

Increase of the electrical field strength at a constant pulse duration resulted in more inactivation at a chosen maximum temperature, what could be seen in FIGS. 1A and 1B from both the left panel in FIGS. 1A and 1B (electrical field strength is 10 kV/cm, 15 kV/cm or 20 kV/cm; pulse duration is 2 microseconds) and the right panel in FIGS. 1A and 1B (electrical field strength is 0.9 kV/cm or 2.7 kV/cm; pulse duration is 1000 microseconds).

This effect of increased electrical field strength could also be observed for the other micro-organisms shown in FIGS. 1A and 1B, presenting more inactivation at a higher electrical field strength. It is expected that further increase of the electrical field strength of the conditions described in this invention, up to 5 kV/cm, would reduce the maximum temperature even more, while still inactivating the desired number of micro-organisms.

Without wishing to be bound by theory, this is explained by the exceedance of the external applied electrical field (E) over the critical electrical field strength (Ec) of the membrane, leading to more damage and inactivation (Alvarez et al., 2006). The Ec varies for different micro-organisms, and there is consensus in the technical field that microbial inactivation requires electrical field strengths above 5 kV/cm (Raso et al., 2014). However, the inventors now show for the first time that also an electrical field strength of below 5 kV/cm, e.g. 2.7 kV/cm, is effective for achieving inactivated micro-organisms at a sufficient level of 1.0E-7 (N/N$_0$) or lower, according to the invention. Comparing the left panels of FIGS. 1A and 1B with the right panels, it is seen that an electrical field strength of 2.7 kV/cm with a pulse duration of 100 microseconds or of 1000 microseconds provides inactivation of micro-organisms to a higher degree, compared to higher electrical field strengths and shorter pulse duration commonly applied in the field.

Without wishing to be bound by theory, it is proposed that the pulse duration plays a critical role in inactivating the micro-organism, hinting at another mechanism for the conditions described in the invention than today used. It is hypothesized that when the pulse duration is long enough, voltage-sensitive protein channels will be opened, and conduct a higher current than they are designed for. As a result, the channels will become irreversibly denaturated, and cells will lose their viability.

*E. coli* inactivation data shows no difference in degree of inactivation at 2.7 kV/cm when pulses of 100 or 1000 microseconds are used, hinting that the critical duration of a the pulse is lower than 100 microseconds.

Furthermore, it can be seen that both Gram-positive as Gram-negative micro-organisms can be inactivated up to 1.0E-7 (N/N$_0$) using this new PEF conditions. Also size of the micro-organisms does not play a prominent in the degree of inactivation (right panel) as they do with the current state of the art conditions (left panel). Although yeasts can be inactivated at lower maximum temperatures at 2.7 kV/cm than *L. plantarum* and *S. Senftenberg*, no big differences are found between *E. coli* and *L. monocytogenes*, at the new PEF conditions, while larger differences are found with current used PEF conditions (left panels).

Example 2: Microbial Inactivation of *E. coli* and *Listeria monocytogenes* in Products with Variable Characteristics (1 L/h Scale)

*Escherichia coli* (ATCC 35218) and *Listeria monocytogenes* NV8 were prepared from frozen stock and cultured in Tryptone Soy Broth (*E. coli*) or Brain Heart Infusion Broth (*L. monocytogenes*), according to the method described in (Timmermans et al., 2014).

Figure 2:
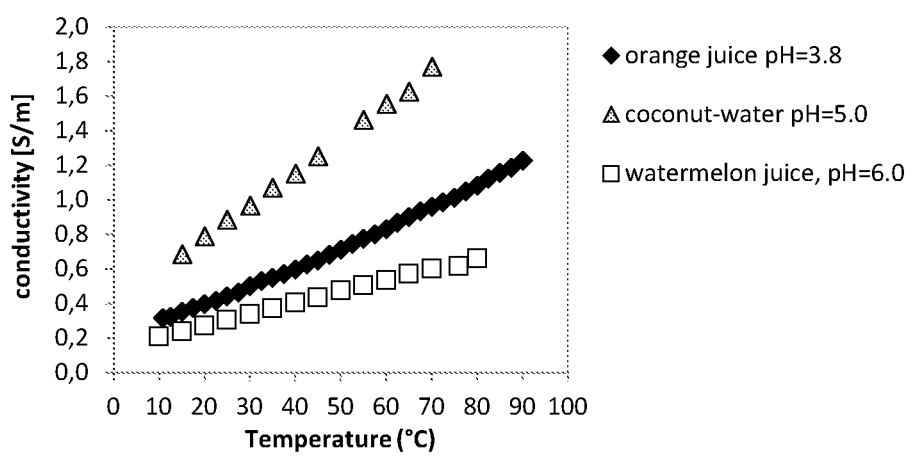
FIG. 2. Temperature-conductivity profile of orange juice (pH 3.8), coconut water (pH 5.0) and watermelon juice (pH 6.0).

After culturing, cells were washed and suspended to reach a concentration of about 1.0E+8 cfu/mL to either orange juice (Minute Maid®), coconut water (Healthy People) or watermelon juice (freshly squeezed), having each a different pH and conductivity (see FIG. 2). The same PEF apparatus system and set-up was used as described in Example 1, having a flow rate of 13.5±0.5 mL/min. However, only one process condition is used: electrical field strength of 2.7 kV/cm and pulse duration of 1000 microseconds. Since the conductivity varies amongst the three products (FIG. 2), a different frequency setting was necessary and the number of pulses given during the treatment to reach a similar maximum temperature for each product differed. In Table 3, the range of tested frequencies, number of pulses and maximum temperatures after treatment for the three tested juices are shown.

Inactivation is shown as the logarithm of number of surviving micro-organism at tested condition, N, divided by start concentration of micro-organisms, $N_0$, being $\log_{10}(N/N_0)$.

TABLE 3

PEF conditions used in this study

| Product | Electrical field strength (kV/cm) | Pulse duration (microseconds) | Residence time in the two treatment chambers (milliseconds) | Frequency (Hz) | Number of pulses | Maximum temperature (° C.) |
|---|---|---|---|---|---|---|
| Orange juice | 2.7 | 1000 | 17.5 ± 0.7 | [0-210] | [0-4] | [36-87] |
| Watermelon juice | 2.7 | 1000 | 17.5 ± 0.7 | [0-240] | [0-4] | [36-72] |
| Coconut water | 2.7 | 1000 | 17.5 ± 0.7 | [0-100] | [0-2] | [36-76] |

Figure 3A:
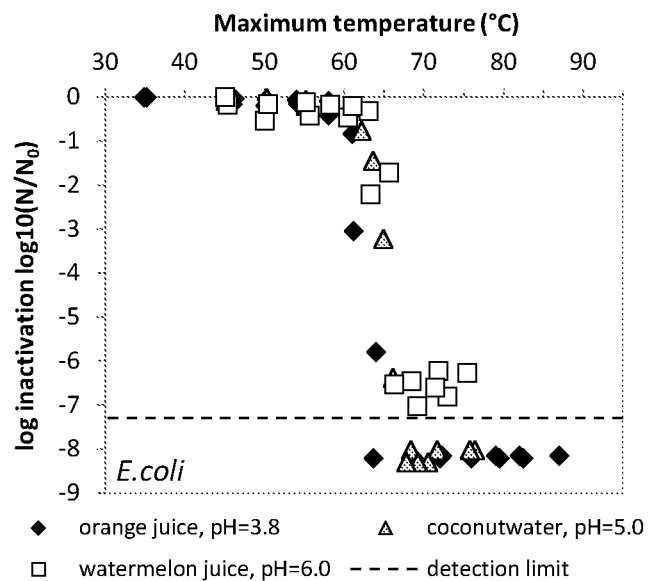
FIGS. 3A and 3B. Reduction of viable counts of *E. coli* and *L. monocytogenes* in orange juice, coconut water and watermelon juice after PEF-treatment at 2.7 kV/cm, 1000 microseconds.
Figure 3B:
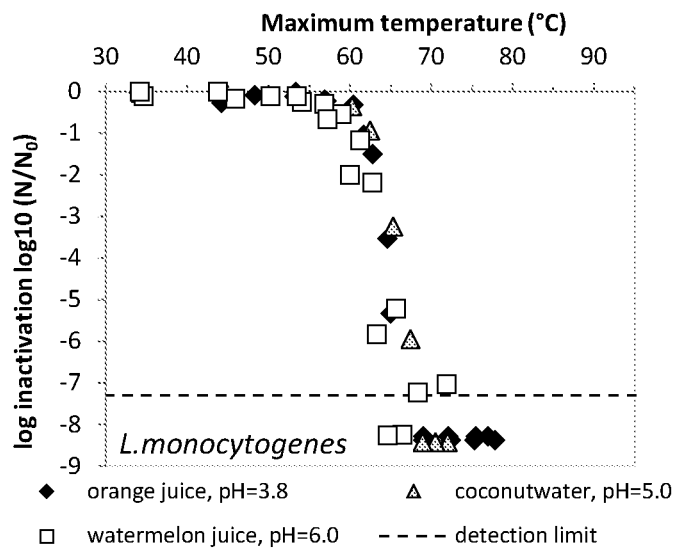

Inactivation of *E. coli* and *L. monocytogenes* at various maximum temperatures in the various juices are shown in FIGS. 3A and 3B. When the inactivation curves of *E. coli* (FIG. 3A) and *L. monocytogenes* (FIG. 3B) are compared for the various liquid media, i.e. the liquid products orange juice, coconut water and watermelon juice, it is seen that no differences are observed for the temperatures at which inactivation starts. Furthermore, the degree of inactivation is similar for orange juice, coconut water and watermelon juice. This shows that the varying pH of the product matrix, i.e. the liquid products orange juice, coconut water and watermelon juice, and the varying electrical conductivity have no effect on the degree of inactivation. Furthermore, a comparable inactivation curve showing inactivation at similar temperature is found for Gram-negative *E. coli* (with a size of the bacterial cell of about 0.7-1.5 micrometer×2-5 micrometer) and for Gram-positive *L. monocytogenes* (with a size of the cell of about 0.4-0.5 micrometer×0.5-2 micrometer), indicating no difference for the micro-organisms used.

This shows that the process of the invention applied to orange juice, coconut water and watermelon juice is similarly effective and efficient with regard to the inactivation of Gram-positive bacteria and Gram-negative bacteria, in a variety of different liquid media, i.e. different liquid food products.

Example 3: Microbial Validation at 1200 L/h Scale

One batch of oranges (variety: Natal folha murcha) was commercially pressed to obtain 4.000 L orange juice. Orange juice was not inoculated with micro-organisms, so the micro-organisms population naturally present in the orange juice was studied to validate the process conditions previously determined at 1 L/h at large scale (1.200 L/h).

Orange juice was pumped at a flow of 1.200±100 L/h and preheated to 59° C. Pulses were delivered in three vertically positioned treatment chambers to reach a maximum temperature of 70° C. The volume of the treatment zone in the middle treatment chamber was smaller (dimensions length: 14 mm, diameter 8 mm) than the treatment zone of the first and third (outer) treatment chambers (dimensions length 14 mm, diameter 12 mm). Due to the connections of the power sources, this resulted in a double electrical field strength in the middle treatment chamber compared to the outer treatment chambers, being 1.9 kV/cm in the middle and 1.0 kV/cm in the outer treatment chamber. Pulses had a fixed duration of 1000 microseconds. Residence time in the middle treatment chamber was 5.4±0.5 milliseconds and in the outer treatment chambers 9.5±0.9 milliseconds the total number of pulses delivered during the treatment were 5.1±0.01 at a repetition rate of 207±18 Hz.

Juice was cooled directly after leaving the treatment chambers within 3 seconds, so holding time was minimised to reduce the heat load on the product. After cooling the juice was packed and aseptically and stored.

Microbial samples of untreated and PEF-treated juice were analysed in duplicate in three different laboratories, having a total of 6 untreated and PEF samples to be analysed. Total mesophilic plate count, total coliforms and number of yeasts and moulds were analysed according to method described by Dowes and ITO (2001). Acidothermophilic Spore-forming Bacteria (ATSB) was analysed according to the method of Eguchi et al., (1999), *Salmonella* was analysed according to the method of AOAC (2000), *Listeria monocytogenes* was analysed according to the method of ISO 11290-1 (1996) and lactic acid bacteria was analysed according to the method of Silva et al. (2007).

Figure 4A:
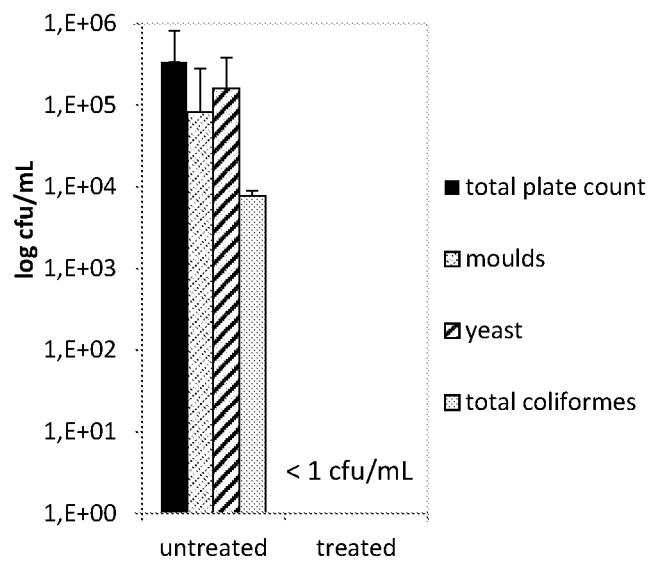
FIGS. 4A and 4B. Microbial analysis (n=6) of untreated and PEF treated orange juice, where some analyses were qualitative (FIG. 4B) and other quantitative (FIG. 4A).
Figure 4B:
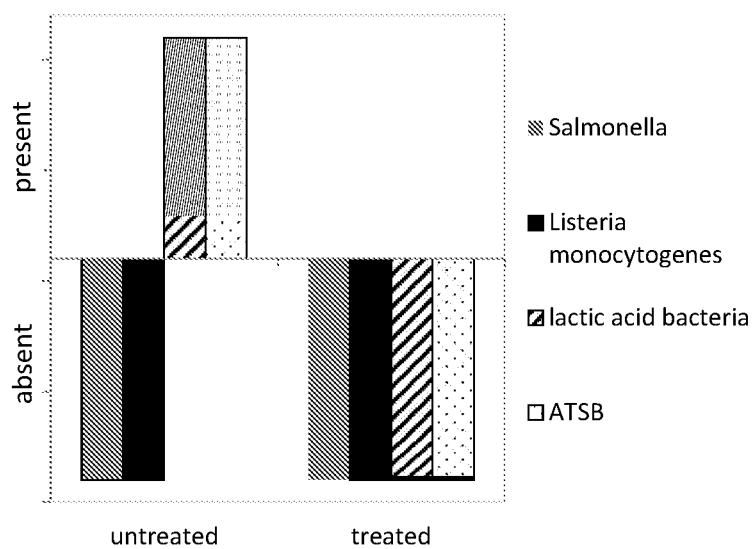

Results of the microbial inactivation in untreated orange juice and in PEF-treated orange juice is depicted in FIGS. 4A and B. The initial microbial load in the untreated orange juice is relatively high, since about 1.0E+5 cfu/mL in untreated orange juice were present (FIG. 4A). After PEF treatment of the orange juice, no micro-organisms were detected on the plates (total plate count), and in addition also neither moulds, nor yeasts, nor coliforms were detected on the plates (all plates show <1 cfu/mL; see FIG. 4A). In FIG. 4B, from the qualitative data it is seen that also all lactic acid bacteria and Acidothermophilic Spore-forming Bacteria (ATSB) that were present in untreated orange juice, were inactivated during the PEF-treatment of said orange juice.

Example 4: Impact of PEF Conditions of the Invention to Quality Aspects and Microbial Shelf Life PEF-treated orange juice samples produced and described in Example 3, were analysed every week during a shelf life study lasting for 3 months. During this period, quality aspects and microbial counts were analysed. Microbial analysis was similar to the methods described in Example 3. For quality analysis, according to methods commonly known in the art, the amount of soluble solids (JBT Food-Tech Citrus Systems, 2011-1), acidity (JBT FoodTech Citrus Systems, 2011-2), pH (JBT FoodTech Citrus Systems, 2011-3), oil content (JBT FoodTech Citrus Systems, 2011-4), vitamin C content (JBT FoodTech Citrus Systems, 2011-5) and pectinesterase activity (Rouse and Atkins, 1955) was measured at indicated times (Table 2). Samples were stored both at 7° C. as well as at room temperature (ambient temperature 20-25° C.) to facilitate an accelerated shelf life study.

Microbial evaluation of the samples was carried out, and results are shown in Table 2. Microbial counts of the PEF treated samples showed to be below the detection limit of 1 cfu/mL, during the entire shelf life study lasting for 104 days, both when the orange juice was stored at 7° C. and when the orange juice was stored at ambient temperature.

Figure 11:
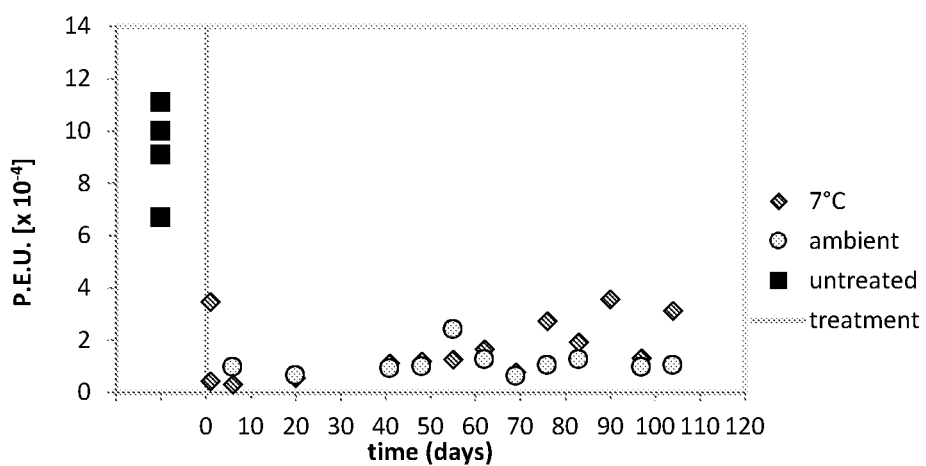
FIG. 11. Pectinesterase activity before PEF treatment and after PEF treatment during 3 months of storage at 7° C. and at ambient temperature.

Differences are found in the pectinmethylesterase (PME) activity before and after PEF treatment (FIG. 11). Due to the temperature generated during the PEF-process, part of the PME-enzyme is inactivated, leading to a reduction of the enzyme activity. That is to say, the heat generated during the process according to the invention increased the temperature of the juice to 70° C. The juice subjected to the PEF process of the invention was preheated to 59° C. before introduction to the PEF apparatus under continuous flow. Inactivation of this enzyme is one of the goals of pasteurisation, as the remaining activity of the enzyme can lead to cloud loss and gelation of citrus juice during storage. Activity of this enzymes is expressed as the release of acid per mL (multiplied by 1.0E+4) during pectin hydrolysis as a function of time at pH 7.8 and 20° C. Generally, most juice pasteurisers

TABLE 4

Results of microbial analysis of PEF-treated orange juice during shelf life, stored either at 7° C. or at ambient temperature.

| | Storage at 7° C. | | | | | Storage at ambient temperature | | | | |
|---|---|---|---|---|---|---|---|---|---|---|
| Day | Total plate count | Yeast | Mould | *Lactobacillus* | ATSB | Total plate count | Yeast | Mould | *lactobacillus* | ATSB |
| | | | | | cfu/mL | | | | | |
| 1 | <1 | <1 | <1 | <10 | absent | <1 | <1 | <1 | <10 | absent |
| 6 | <1 | <1 | <1 | <10 | NA. | <1 | <1 | <1 | <10 | NA. |
| 13 | NA. | NA. | NA. | NA. | absent | NA. | NA. | NA. | NA. | absent |
| 20 | <1 | <1 | <1 | NA. | NA. | <1 | <1 | <1 | NA. | NA. |
| 27 | <1 | <1 | <1 | NA. | NA. | <1 | <1 | <1 | NA. | NA. |
| 34 | <1 | <1 | <1 | NA. | NA. | <1 | <1 | <1 | NA. | NA. |
| 41 | <1 | <1 | <1 | NA. | NA. | <1 | <1 | <1 | NA. | NA. |
| 48 | <1 | <1 | <1 | NA. | NA. | <1 | <1 | <1 | NA. | NA. |
| 55 | <1 | <1 | <1 | NA. | NA. | <1 | <1 | <1 | NA. | NA. |
| 62 | <1 | <1 | <1 | NA. | NA. | <1 | <1 | <1 | NA. | NA. |
| 69 | <1 | <1 | <1 | NA. | NA. | <1 | <1 | <1 | NA. | NA. |
| 76 | <1 | <1 | <1 | NA. | NA. | <1 | <1 | <1 | NA. | NA. |
| 83 | <1 | <1 | <1 | NA. | NA. | <1 | <1 | <1 | NA. | NA. |
| 90 | <1 | <1 | <1 | NA. | NA. | <1 | <1 | <1 | NA. | NA. |
| 97 | <1 | <1 | <1 | NA. | NA. | <1 | <1 | <1 | NA. | NA. |
| 104 | <1 | <1 | <1 | NA. | NA. | <1 | <1 | <1 | NA. | NA. |

NA. Not analysed

Sensorial evaluation was carried out by a trained panel. Samples were evaluated for overall appearance, colour, smell and taste. Samples were rated as "good", when properties were similar to freshly squeezed orange juice, and samples were rated as "not good" when it was not anymore the premium quality of freshly squeezed juice.

Figure 5A:
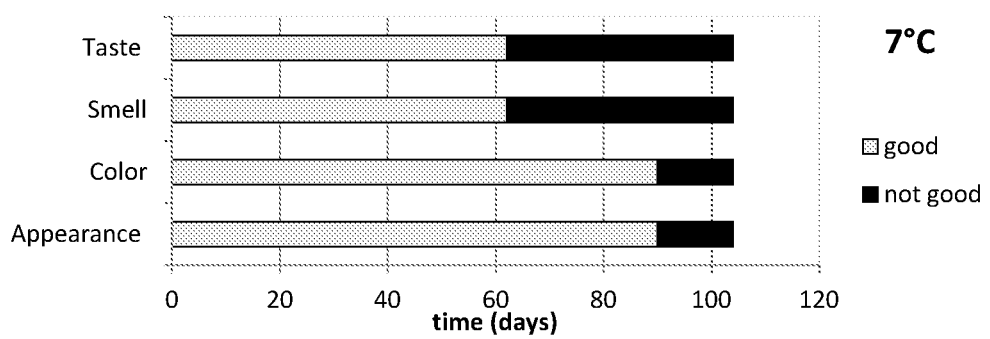
FIGS. 5A and 5B. Sensorial evaluation of the orange juice samples, stored at 7° C. and ambient temperature over the indicated time period, where samples were indicated as 'good' when being comparable to freshly squeezed orange juice and 'not good' if not being comparable to freshly squeezed orange juice.
Figure 5B:
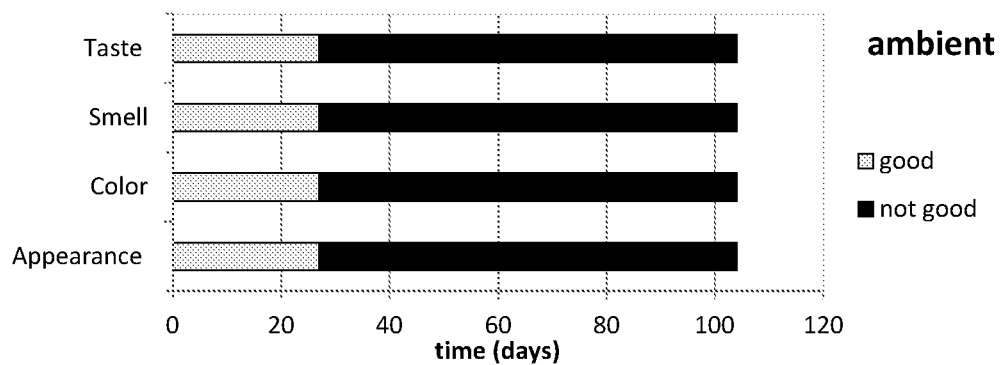

Results of the sensorial analysis during shelf life are shown in FIGS. 5A and 5B. Samples stored at 7° C. showed to be similar to freshly squeeze orange juice until 64 days of shelf life. After this storage time, fresh smell and taste are reduced, although appearance and colour of the juice was considered as "good" until 90 days of storage at 7° C. (FIG. 5A). PEF-treated juices stored at ambient temperatures were only acceptable until 27 days of storage (FIG. 5B). After this time, it could not be considered as fresh juice, anymore.

Quality aspects of the orange juice were monitored as well. For these aspects, the untreated juice was evaluated prior to PEF treatment as well, to evaluate the impact of the process on these aspects.

Figure 6:
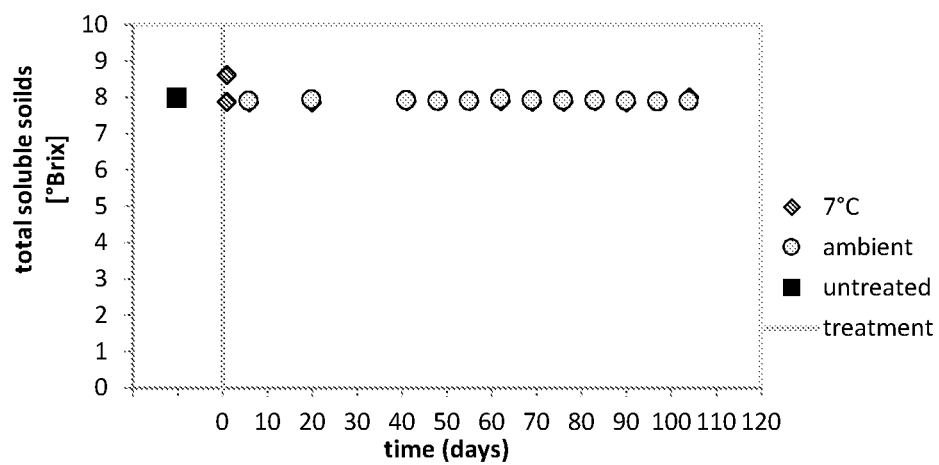
FIG. 6. Amount of soluble solids (° Brix) in orange juice before PEF treatment and after PEF treatment during 3 months of storage at 7° C. and at ambient temperature.
Figure 7:
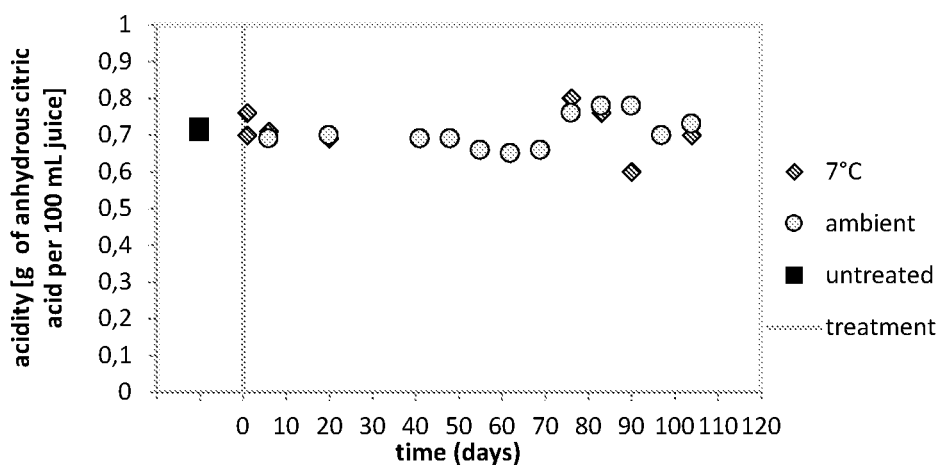
FIG. 7. Acidity of orange juice before PEF treatment and after PEF treatment during 3 months of storage at 7° C. and at ambient temperature.
Figure 8:
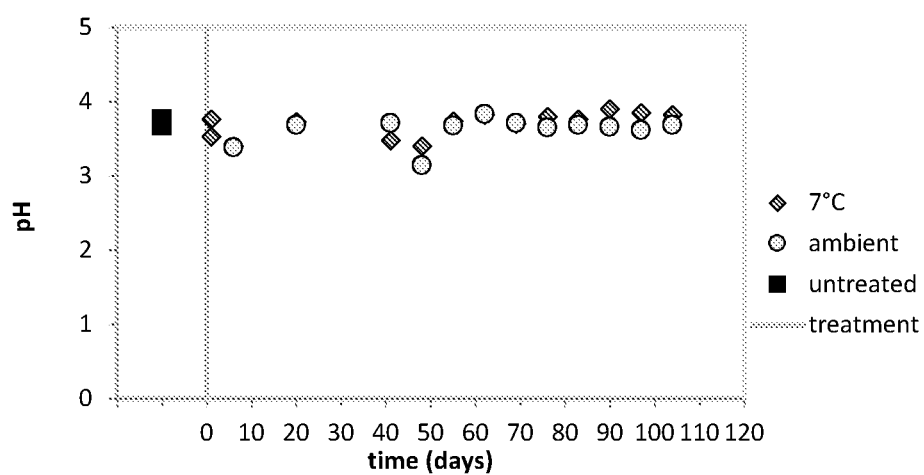
FIG. 8. pH of orange juice before PEF treatment and after PEF treatment during 3 months of storage at 7° C. and at ambient temperature.
Figure 9:
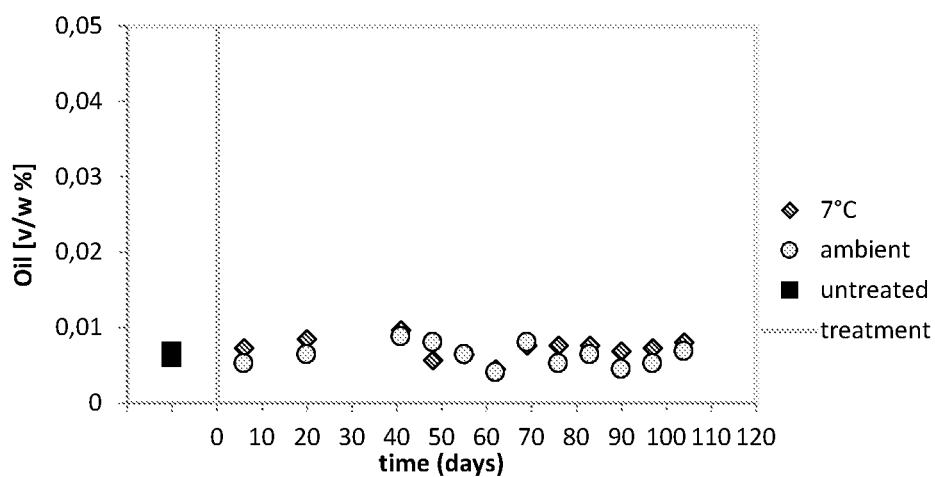
FIG. 9. Oil content of orange juice before PEF treatment and after PEF treatment during 3 months of storage at 7° C. and at ambient temperature.
Figure 10:
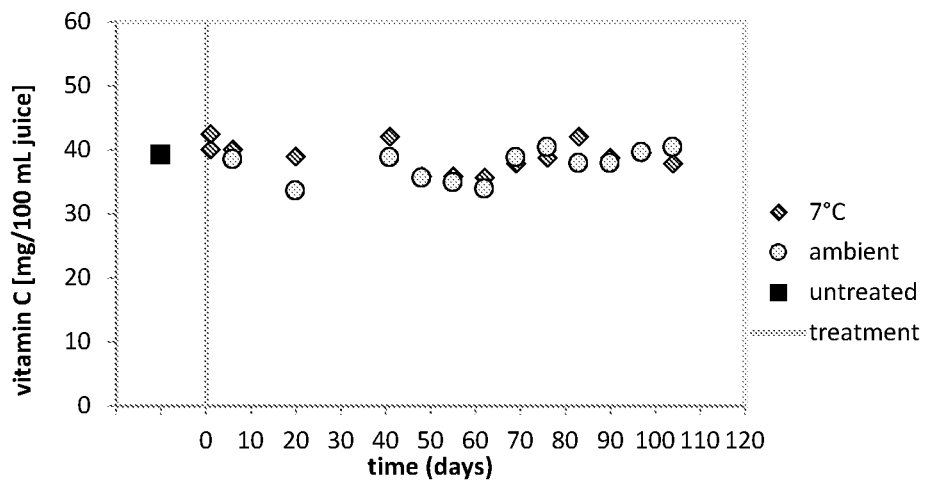
FIG. 10. Vitamin C content of orange juice before PEF treatment and after PEF treatment during 3 months of storage at 7° C. and at ambient temperature.

The amount of total soluble solids (° Brix) (FIG. 6; curves for experiments conducted at 7° C. and at ambient temperature coincide for day 6 and onwards in the graph), acidity (FIG. 7), pH (FIG. 8), oil content (FIG. 9) and vitamin C content (FIG. 10) did not change by PEF-treated and during storage at 7° C. and storage at ambient temperature.

provide juice having pectinesterase activity expressed in pectinesterase units (PEU) with values of between 1.0E-6 to 1.0E-4.

REFERENCES

AOAC (2000). AOAC Official Method 989.13-1998. Motile *Salmonella* in all foods. AOAC International, Official Method of Analysis of AOAC International.

Álvarez, I., Condón, S., Raso, J., (2006). Microbial inactivation by pulsed electric fields. In: Raso, J., Heinz, V. (Eds). Pulsed Electric Fields Technology for the Food Industry, Fundamentals and Applications. Springer, New York.

Bergey, 1986. Manual of systematic bacteriology. Williams and Wilkins, Baltimore Campos, F. P., Cristianini, M. (2007) Inactivation of *Saccharomyces cerevisiae*, and *Lactobacillus plantarum* in orange juice using ultra high-pressure pasteurisation. Innovative Food Science and Emerging Technologies, 8, 226-229

Doyle, M. E., Mazotta, A. S. (2000) Review studies on the thermal resistance of *Salmonella*. Journal of Food Protection, 63, 779-795

Dowes, F. P., Ito, K., (2001). Compendium of methods for the microbiological examination of foods. 4$^{th}$ edition. American Public Health Association, Washington, D.C.

Eguchi, S. Y., Manfio, G. P., Pinhatti, M. E., Azuma, E., Variane, S. F. (1999). Acidothermophilic sporeforming bacteria (AT SB) in orange juices: detection methods, ecology, and involvement in the deterioration of fruit juices. Report of the research project ABE Citrus, Campinas (SP), Brasil.

El Zakhem, H., Lanoisellé, J-L., Lebovka, N. I., Nonus, M., Vorobiev, E. (2006) Behavior of yeast cells in aqueous suspension affected by pulsed electric field. Journal of Colloid and Interface Science, 300, 553-563

El Zakhem, H., Lanoisellé, J-L., Lebovka, N. I., Nonus, M., Vorobiev, E. (2007) Influence of temperature and surfactant on *Escherichia coli* inactivation in aqueous suspensions treated by moderate pulsed electric fields. International Journal of Food Microbiology, 120, 259-265

Eynard, N., Rodriguez, F., Trotard, J., Teissié, J. (1998) Electrooptics studies of *Escherichia coli* electropulsation: orientation, permeabilization and gene transfer. Biophysical Journal, 75, 2587-2596

Gurtler, J. B., Bailey, R. B., Geveke, D. J., Zhang, H. Q. (2011) Pulsed electric field inactivation of *E. coli* O157: H7 and non-pathogenic surrogate *E. coli* in strawberry juice as influenced by sodium benzoate, potassium sorbate, and citric acid. Food Control, 22, 1689-1694

Heinz, V., Alvarez, I., Angersbach, A., Knorr, D. (2002). Preservation of liquid foods by high intensity pulsed electric fields—basic concepts for process design. Trends in Food Science & Technology, 12, 103-111

ISO 11290-1 (1996). Microbiology of food and animal feeding stuffs. Horizontal method for the detection and enumeration of *Listeria monocytogenes*—Part 1: detection method.

JBT Food Tech Citrus Systems (2011-1). Total soluble solids by refractometer. In: Procedures for analysis of citrus products. 6$^{th}$ Edition, Lakeland.

JBT Food Tech Citrus Systems (2011-2). Total titratable acidity (industry method) In: Procedures for analysis of citrus products. 6$^{th}$ Edition, Lakeland.

JBT Food Tech Citrus Systems (2011-3). pH. In: Procedures for analysis of citrus products. 6$^{th}$ Edition, Lakeland.

JBT Food Tech Citrus Systems (2011-4). Recoverable oil (Scott method). In: Procedures for analysis of citrus products. 6$^{th}$ Edition, Lakeland.

JBT Food Tech Citrus Systems (2011-5). Ascorbic acid by Iodine titration. In: Procedures for analysis of citrus products. 6$^{th}$ Edition, Lakeland.

Loeffler, M. J. (2006) Generation and application of high intensity pulsed electric fields. In: Heinz, V., Raso, J. (Eds.) Pulsed electric field technology for the food industry—fundamentals and applications. Springer, New York.

Mastwijk, H. C. (2006) Pulsed Power systems for application of pulsed electric fields in the food industry. In: Heinz, V., Raso, J. (Eds.) Pulsed electric field technology for the food industry—fundamentals and applications. Springer, New York.

Mastwijk, H. C., Gulfo-van Beusekom, K., Pol-Hofstad, I. E., Schuten, H., Boonman, M, Bartels, P. V. (2007). Definitions and guidelines for reporting on pulsed electric field experiments. In: Lelieveld, H. L. M., Notermans, S., de Haan, S. W. H. (Eds.). Food preservation by pulsed electric fields. From research to application. Woodhead publishing.

Raso, J., Condón, S., Álvarez, I., (2014). Non-thermal processing. Pulsed Electric Field. In: Batt, C. A. (Ed). Encyclopedia of Food Microbiology (second edition). Elsevier.

Put, H. M. C., De Jong, J., Sand, F. E. M. J., Van Grinsven, A. M. (1976) Heat resistance studies on yeast spp. causing spoilage in soft drinks. Journal of Applied Bacteriology, 40, 135-152

Rouse, A. H., and Atkins, C. D. (1955) Pectinesterase and pectin in commercial citrus juices as determined by methods used at the citrus experiment station. Florida Agricultural Experiment Stations, 570, 3-19.

Saulis, G., Wouters, P. C. (2007). Probable mechanisms of microorganism inactivation by pulsed electric fields. In: Lelieveld, H. L. M., Notermans, S., de Haan, S. W. H. (Eds.). Food preservation by pulsed electric fields. From research to application. Woodhead publishing.

Sharma, P., Bremer, P., Oey, I., Everett, D. W. (2014) Bacterial inactivation in whole milk using pulsed electric field processing. International Dairy Journal, 35, 49-56

Silva, N., Junqueira, V. C. A., Silveira, N. F. A., Taniwaki, M. H., Santos, R. F. S., Gomes, R. A. R., Okazaki, M. M., (2007). Manual de Métodos de análise microbiológica de alimentos, third edition, São Paulo.

Timmermans, R. A. H., Nierop Groot, M. N., Nederhoff, A. L., van Boekel, M. A. J. S., Matser, A. M. Mastwijk, H. C. (2014). Pulsed electric field processing of different fruit juices: Impact of pH and temperature on inactivation of spoilage and pathogenic micro-organisms. International Journal of Food Microbiology, 173, 105-111.

Tsong, T. Y. (1992) Time sequence of molecular events in electroporation. In: Chang, D. C., Chassy, B. M., Saunders, J. A., Sowers, A. E. (Eds). Guide to electroporation and electrofusion. Academic Press Van der Veen, S., Wagendorp, A., Abee, T., Wells-Bennink, M. H. (2009). Diversity assessment of heat resistance of *Listeria monocytogenes* strains in a continuous-flow heating system. Journal of Food Protection, 5, 999-1004

Wouters, P. C., Dutreux, N., Smelt, J. P. P. M., Lelieveld, H. L. M. (1999). Effects of pulsed electric fields on inactivation kinetics of *Listeria innocua*. Applied and Environmental Microbiology, 65, 5364-5371

What is claimed:

1. A process for inactivation of micro-organisms in a liquid product, comprising:
    (a) continuously supplying and flowing the liquid product to an inlet of an apparatus for homogeneously heating the liquid product by resistive heating using a pulsed electric field;
    (b) continually generating a pulsed electrical current through the flowing liquid product in the apparatus using the pulsed electric field, wherein the electrical field strength of the electric field is from 0.1 to 3 kV/cm,
    wherein minimally one pulse with a rectangular pulse shape is applied on each fluid element during passage with a pulse duration of at least 10 microseconds,
    wherein the maximum temperature of the heated liquid product remains between 40° C. and 85° C. during the resistive heating without external cooling or external heating, and
    wherein the microbial count (cfu) in the liquid product is reduced by at least 2 log cfu/mL.

2. The process according to claim 1, wherein the pH of the liquid product is between pH 1.5 and 9.0.

3. The process according to claim 2, wherein the pH of the liquid product is between pH 4.8 and 9.0.

4. The process according to claim 1, wherein the liquid product has an electrical conductivity between 0.01 and 10 S/m measured at 20° C.

5. The process according to claim 4, wherein the liquid product has an electrical conductivity between 0.1 and 3 S/m measured at 20° C.

6. The process according to claim 5, wherein the liquid product is a dairy product selected from milk, a milk product or a liquid composition comprising a milk component or a milk fraction.

7. The process according to claim 1, wherein the liquid product is a liquid food product or a liquid feed product.

8. The process according to claim 1, wherein the liquid product is an ingredient, semi-finished product, or final liquid product.

9. The process according to claim 8, wherein the final liquid product is fruit juice, vegetable juice, smoothie, a jam, a spread, an alcoholic beverage, a non-alcoholic beverage, dairy product, plant milk product, liquid egg, a soup or a sauce.

10. The process according to claim 1, wherein the temperature of the liquid product autonomously remains between 40° C. and 75° C. during the resistive heating.

11. The process according to claim 1, wherein the electrical field strength is from 0.1 to 2.7 kV/cm.

12. The process according to claim 1, wherein the pulse duration is 10 to 2000 microseconds.

13. The process according to claim 12, wherein the pulse duration is 50 to 500 microseconds.

14. The process according to claim 1, wherein bipolar pulses are applied.

15. The process according to claim 1, wherein the heated liquid product is cooled immediately after flowing through the apparatus.

16. The process according to claim 1, wherein the liquid product is preheated before being supplied to the apparatus to a temperature between 20° C. and 70° C.

17. The process according to claim 16, wherein the liquid product is preheated before being supplied to the apparatus to a temperature between 35° C. and 65° C.

18. The process according to claim 1, wherein the microbial count (cfu) in the liquid product is reduced by at least 5 log cfu/mL.

19. The process according to claim 1, wherein the liquid product is subjected to the electrical field for about 17 milliseconds to 2 seconds.

* * * * *